(12) United States Patent
Crim

(10) Patent No.: US 6,613,099 B2
(45) Date of Patent: Sep. 2, 2003

(54) PROCESS AND SYSTEM FOR PROVIDING A TABLE VIEW OF A FORM LAYOUT FOR A DATABASE

(75) Inventor: Christopher L. Crim, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/378,599

(22) Filed: Aug. 20, 1999

(65) Prior Publication Data

US 2002/0152189 A1 Oct. 17, 2002

(51) Int. Cl.$^7$ ............................................... G06F 17/00
(52) U.S. Cl. ........................ 715/523; 715/505; 715/506; 715/509; 707/102
(58) Field of Search ........................ 707/102; 345/418, 345/640; 715/500, 503, 504–507, 508–510, 522–523, 528–529, 537–542

(56) References Cited

U.S. PATENT DOCUMENTS

| | | | | |
|---|---|---|---|---|
| 5,280,575 A | * | 1/1994 | Young et al. | 707/504 |
| 5,659,742 A | * | 8/1997 | Beattie et al. | 707/104.1 |
| 5,692,181 A | * | 11/1997 | Anand et al. | 707/102 |
| 5,724,575 A | * | 3/1998 | Hoover et al. | 707/10 |
| 5,761,650 A | * | 6/1998 | Munsil et al. | 705/34 |
| 5,787,416 A | * | 7/1998 | Tabb et al. | 707/2 |
| 5,808,914 A | * | 9/1998 | Shin et al. | 703/2 |
| 5,826,258 A | * | 10/1998 | Gupta et al. | 707/4 |
| 5,913,214 A | * | 6/1999 | Madnick et al. | 707/10 |
| 5,953,730 A | * | 9/1999 | Schawer | 707/503 |
| 6,018,346 A | * | 1/2000 | Moran et al. | 345/358 |
| 6,058,391 A | * | 5/2000 | Gardner | 707/4 |
| 6,073,134 A | * | 6/2000 | Shoup et al. | 707/100 |
| 6,108,657 A | * | 8/2000 | Shoup et al. | 707/100 |
| 6,115,759 A | * | 9/2000 | Sugimura et al. | 710/52 |
| 6,134,557 A | * | 10/2000 | Freenan | 707/102 |
| 6,163,781 A | * | 12/2000 | Wess, Jr. | 705/2 |
| 6,189,003 B1 | * | 2/2001 | Leal | 707/10 |
| 6,205,453 B1 | * | 3/2001 | Tucker et al. | 707/503 |
| 6,215,502 B1 | * | 4/2001 | Ferguson | 345/433 |
| 6,226,659 B1 | * | 5/2001 | Wong et al. | 707/526 |
| 6,246,410 B1 | * | 6/2001 | Bergeron et al. | 345/744 |

OTHER PUBLICATIONS

Using Quattro Pro 6 for Windows, Que Corporation, 1994, pp. 22, 156–158, 168–174, 185–215, 414–415, 443–444.*
Roger Jennings, Using Access 97, Que Corporation, Second Edition, pp. 401–447.*
Microsoft Access 97, Report Wizard (screen shots), Microsoft Corporation, 1996, pp. 1–4.
Lotus Approach: Exploring Approach, Release 9, pp. 6–22 to 6–26.
Lotus Smartsuite Millennium Edition for Dummies, Chapter 15, "Putting Your Database on Report", pp. 239–252.

* cited by examiner

*Primary Examiner*—Joseph H. Feild
(74) *Attorney, Agent, or Firm*—Beyer Weaver & Thomas LLP

(57) ABSTRACT

The present invention provides methods and apparatus for displaying data associated with a plurality of records in a database, including obtaining a first layout including a body defining a plurality of fields having a specified order and associated attributes, each of the associated attributes having a corresponding attribute value. A second layout is created from the first layout such that the second layout includes selected ones of the plurality of fields, the second layout being adapted for displaying a plurality of records such that values associated with the same field of the plurality of records are displayed adjacent to one another. Attribute values corresponding to at least some of the attributes associated with the plurality of fields are then copied from the first layout to the second layout. The second layout is then displayed.

49 Claims, 16 Drawing Sheets

FIG. 6

PROCESS AND SYSTEM FOR PROVIDING A TABLE VIEW OF A FORM LAYOUT FOR A DATABASE

CROSS-REFERENCE TO RELATED APPLICATION

This application is related to U.S. patent application Ser. No. 09/378,526, filed concurrently herewith, entitled "ASSISTANT FOR CREATION OF LAYOUTS OR REPORTS FOR DATABASES", pending, and assigned to the assignee of the present application, and hereby incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to databases, and more particularly, to generating and viewing data from databases in a table form.

2. Description of the Related Art

Early database software programs were a great relief for people who needed to organize and store vast amounts of data. Thus, databases allowed people to input and store information in a form that could be easily re-called and updated. As is well known in the art, database programs are no longer only used in business settings, but have gained tremendous acceptance and usage by families and students. By way of example, families have used database programs to keep medical records, keep a budget, maintain an inventory of assets, and compile wedding plan information. Similarly, students may use a database program to maintain student loan records, prioritize class events, and coordinate field trips.

Generally, database programs have gained increased acceptance by the computing public with the advent of more user friendly database programs which have made data entry more efficient. Although there have been great improvements in data entry, there is still a great need for database programs that reduce the hassles associated with viewing the data in various formats. By way of example, it may be desirable to view all data associated with a single record. As another example, it may be desirable to compare selected data associated with multiple records. Thus, each time a user wishes to view data in a different format, it is necessary to create a new "report template." As a result, this typically requires repetitively entering frequently viewed fields from scratch each time the information is needed for a particular report template.

In operation, when a database designer wants to define fields for a particular database, a form layout window can be used. FIG. 1 shows a screen shot illustrating an exemplary form layout window used to define fields for a database. In this example, an optional header, "Golf Money Winners" 102, is created and a number of fields 104 are defined to create a body 103. As shown, a last name field 106, a first name field 108, an events field 110, and a total prize money field 112 are defined in the body 103 of the form layout window. Although the form layout may include a footer, a footer is not included in this example.

Once data has been entered and stored in the database, it is often desirable to view the data for a particular record. In the simplest case, the data may be viewed in the format in which it has been entered. Thus, the form layout window is suitable for obtaining (i.e., entering) data for a particular record as well as for displaying data associated with a single database record. FIG. 2 illustrates a screen shot illustrating an exemplary form view window having a number of fields used to view a single record. As shown, the form view window displays fields for a single record. For example, the header 102 and the body 103, which includes the last name field 106, "Sutton", first name field 108, "Hal", events field 110, "30", and total prize money field 112, "$1,838,740", are displayed for a single record. Thus, the form view window includes a body defining a plurality of fields which have a specified order as well as associated attributes. For example, attributes such as degree of rotation, color, and font may be associated with each field. In addition, each of the attributes has a corresponding attribute value. For instance, an attribute such as the font may be specified by values such as Times New Roman. In addition, the order as specified in this example requires that the last name of each of the golf money winners be displayed as the first field of the body 103. Although the form view format provides a simple mechanism to view a single database record, it is often desirable to view and compare multiple database records. For this purpose, the form view report format is inadequate.

Rather than viewing a single record, multiple records are often simultaneously displayed. FIG. 3 is a screen shot illustrating an exemplary list view window used to view multiple records. In addition to the title 102, "Golf Money Winners," the bodies of multiple records as entered in the main form layout and displayed in the form view format are displayed consecutively. As shown, the body of a first record 302 is shown to include the last name field 304, "Woods", the first name field 306, "Tiger", the Events field 308, "20", and the total prize money field 310, "$1,841,117". Similarly, the body of a second record 312 is shown to include the last name field 314, "Sutton," the first name field 316, "Hal," the events field 318, "30", and the total prize money field 320, $1,838,740. Although multiple records are displayed, it may be desirable to compare field values of multiple records. For instance, a viewer may wish to compare the total prize money won by multiple golf players. However, each of the records is displayed such that the fields associated with a single one of the records are displayed in multiple rows as well as columns. Moreover, since the records are displayed consecutively in the list view format, the values associated with the same field of multiple records are not displayed adjacent to one another and only a few records at most can be concurrently displayed. As a result, it is difficult to make such a simple comparison between values of the same field. From this list view window, it is difficult to make such a determination. Accordingly, although multiple records may be simultaneously displayed in this manner, the list view format does not facilitate comparisons of fields of multiple records.

As described above, it is difficult to compare fields of multiple records using a form view or a list view format. Moreover, it is often desirable to display the same data in a variety of formats. For instance, it may be desirable to vary the format (e.g., appearance) of the fields (e.g., font, column width) as well as the order of the fields. In addition, it may be desirable to alter the manner in which each field is displayed through the association of various attributes such as color, font, or degree of rotation. Although a variety of products are currently available that enable a user to customize the display of data, many of these require each report format to be created separately. As a result, the creation of multiple report formats often requires duplicative efforts. Customizing the display of data is therefore a tedious and time-consuming process.

In view of the foregoing, what is needed is a process and system for displaying multiple records in a report format that facilitates comparison of the records. Moreover, it would be desirable if the report format could be created and modified by a user while minimizing the efforts required by the user.

SUMMARY OF THE INVENTION

The present invention relates to a process and system for presenting data in the format of a table. This is accomplished through the generation of a report format hereinafter referred to as a "layout" using formatting information from an existing layout. In this manner, the present invention enables a user to customize the display of data in a table format using existing formatting information.

The invention can be implemented in numerous ways, including as a process, an apparatus, a system, a device, a method, or a computer readable medium. Several embodiments of the invention are discussed below.

According to one aspect of the invention, a first layout is obtained. For instance, the first layout may be a form layout used to enter data as well as display data associated with a single database record. The first layout includes a body including a plurality of fields having a specified order and associated formatting information. More particularly, the formatting information may be stored in the form of attributes, each of which having a corresponding attribute value. For instance, the attributes may identify a color, font, or degree of rotation associated with the corresponding field. A second layout is created from the first layout such that the second layout includes selected formatting information from the first layout. The second layout is preferably adapted for displaying a plurality of records such that values associated with the same field of the plurality of records are displayed adjacent to one another, and will hereinafter be referred to as a "table layout". According to one embodiment, the second layout is created such that it includes selected ones of the plurality of fields from the first layout. Attribute values corresponding to at least some of the attributes associated with the plurality of fields are then copied from the first layout to the second layout. The second layout may then be displayed on a screen or printed using the formatting information obtained from the first layout.

According to another aspect of the invention, modifications made to the form layout are reflected in the table layout. More particularly, modifications are made to selected ones of the plurality of fields of the form layout. The table layout is then automatically modified to include the modifications. These modifications may include, but are not limited to, adding, deleting, or reordering fields in the body of the layout, headers or footers, as well as modifying attribute values associated with various attributes. Thus, all changes or selected changes may be copied from the form layout to the table layout. However, if desired, the user may modify the table layout or provide default settings to override the information copied from the form layout.

The advantages of the present invention are numerous. The present invention enables database records to be displayed in a table format to facilitate comparison of the fields of the database records. This is accomplished through the creation of a table layout using formatting information previously established in an existing form layout. Thus, software used to create and display the form layout may be used to create and display the table layout. As a result, the design, programming and testing time required to create the table layout from the form layout are minimized. Moreover, since formatting information is automatically translated from the form layout to the table layout, the efforts required on the part of the user in formatting the data for display are dramatically reduced.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 6 is a screen shot illustrating an exemplary print preview window used to view the table view window in print format.

DETAILED DESCRIPTION OF THE INVENTION

As can be appreciated, it is often desirable to display records in a manner suitable for comparing the values of fields of those records. In order to assist a user in creating such a report, the present invention enables database records to be displayed in a table format using formatting information from an existing layout. In addition, the newly created report may then be modified to alter or override portions of the formatting information from that obtained from the existing layout.

Figure 1:
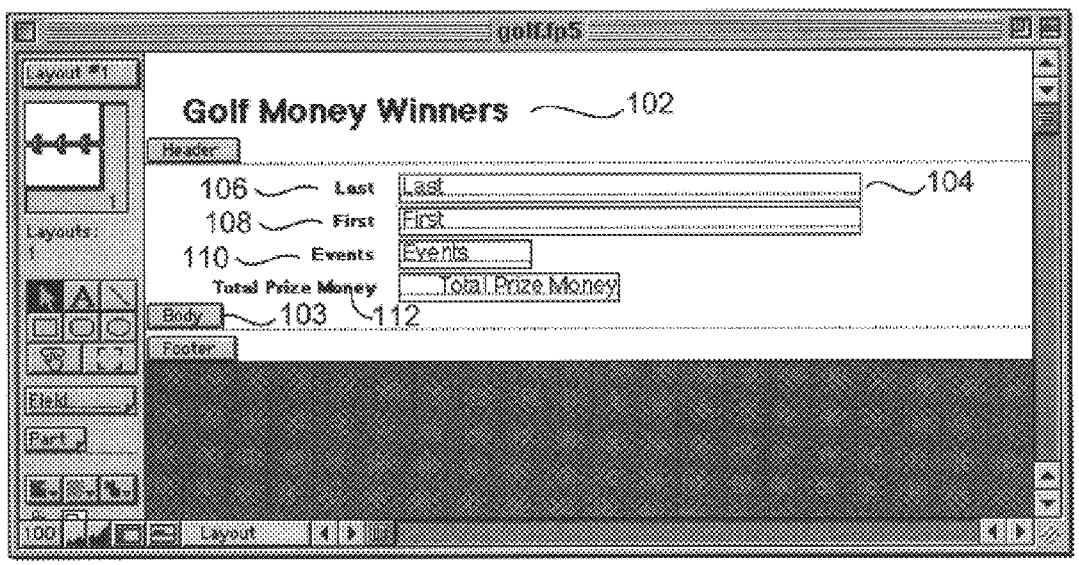
FIG. 1 is a screen shot illustrating an exemplary form layout window used to define fields for a database.
Figure 2:
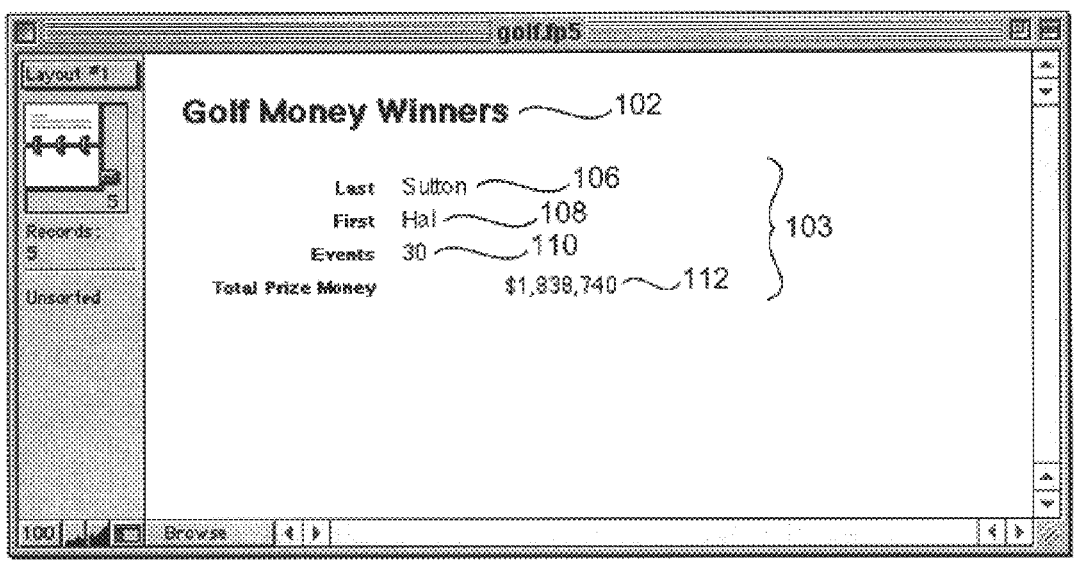
FIG. 2 is a screen shot illustrating an exemplary form view window having a number of fields used to view a database.
Figure 3:
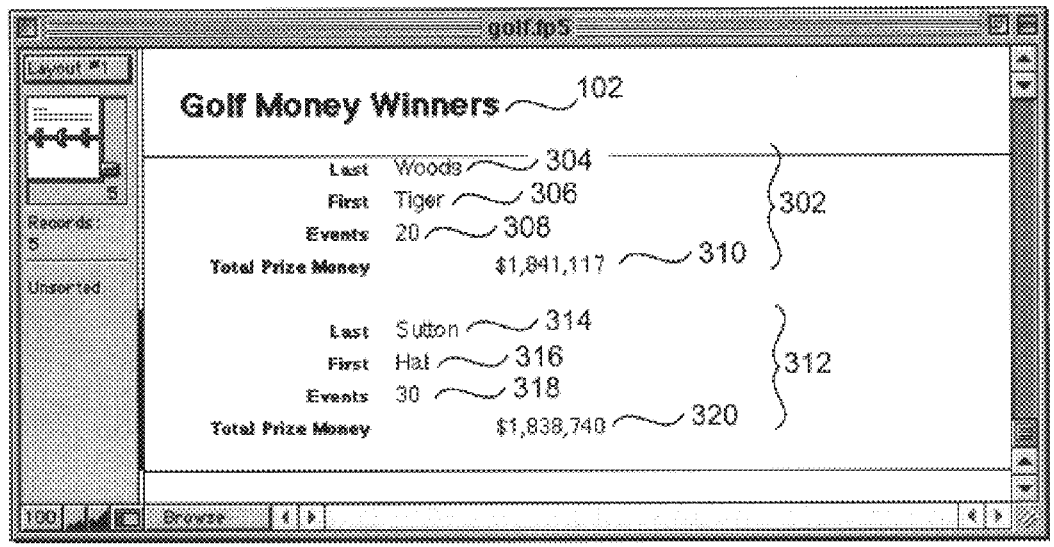
FIG. 3 is a screen shot illustrating an exemplary list view window used to view one or more records in a database.
Figure 4:
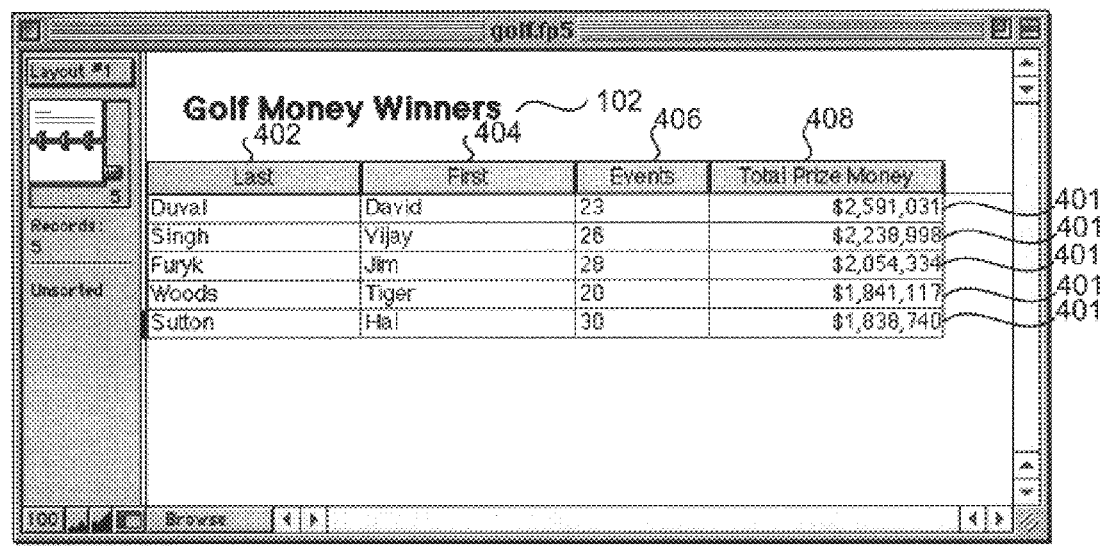
FIG. 4 is a screen shot illustrating an exemplary table view window in which various fields from the form layout are displayed for one or more records in the database.

Referring now to FIG. 4, a screen shot illustrating an exemplary table view window in which various fields from the form layout may be displayed for one or more records of a database is presented. As shown, the table view window is capable of displaying multiple records 401 such that values associated with the same field of the plurality of records are displayed adjacent to one another. For instance, column header 402 identifies the last name field and the corresponding column includes a column of last names such that the last names associated with the records 401 are displayed adjacent to one another. In this example, the values are displayed in a single column. However, values may similarly be displayed in a single row to facilitate comparison of the values. Values associated with column header 404 identifying the first name field, column header 406 identifying the events field, and column header 408 identifying the total prize money field are similarly displayed for the records 401. As will be described with reference to the following figures, the present invention enables selected fields from a first layout such as the Form Layout created in FIG. 1 and displayed in FIG. 2 to be presented in the form of a second layout such as the table layout of FIG. 4. Thus, through the present invention, a user may view data in a variety of formats without requiring duplicate efforts on the part of the user or designer to generate customized reports.

In order to create a new report format from a previously existing format, the user initiates the generation of a report. For instance, the user may select the "view as form" option followed by the "view as table" option from a displayed menu. Thus, upon viewing the form layout, the user may ascertain that the appropriate form has been selected. The table layout may then be generated from this form layout.

Figure 5:
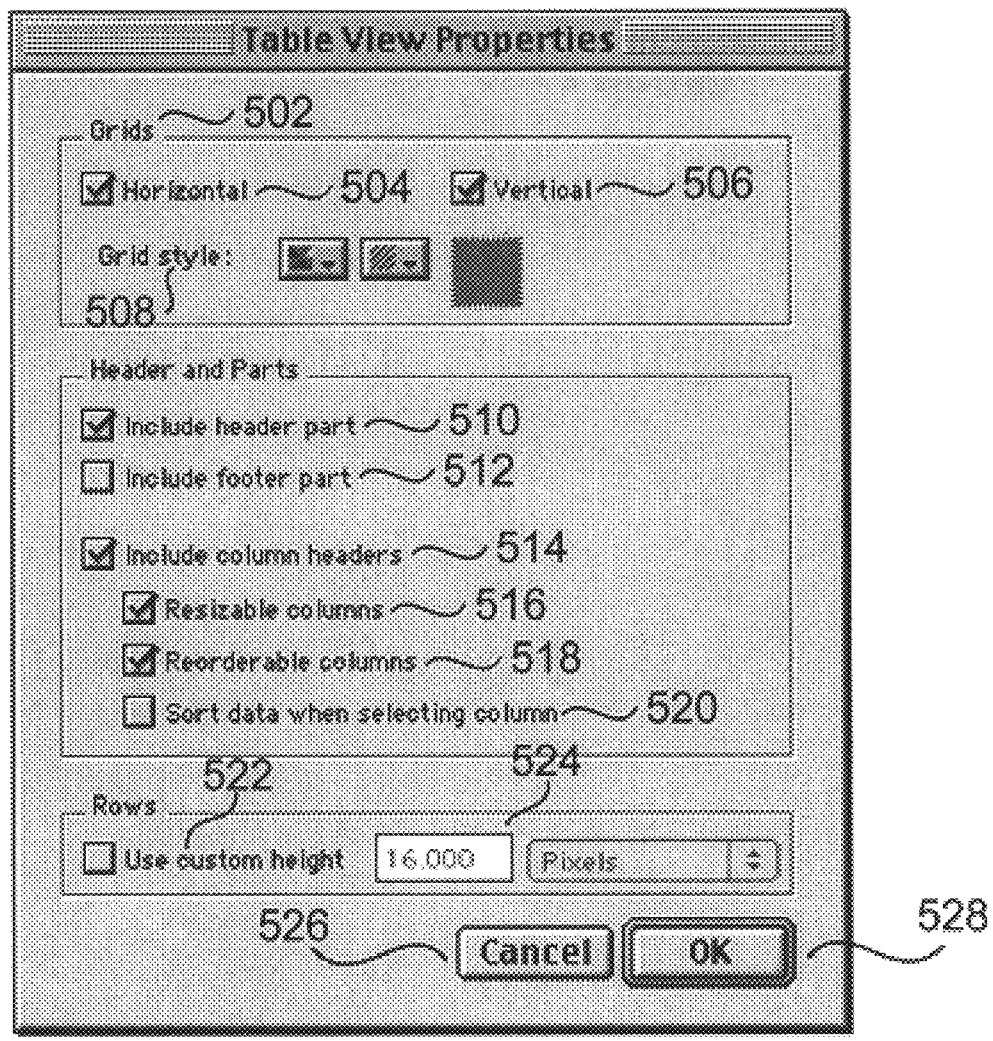
FIG. 5 is a screen shot illustrating an exemplary table view properties window used to select properties for display of one or more database records in the table view window.

According to one embodiment, the user may select those portions of the form layout that are to be translated to the table layout. Thus, the user may wish to select information to be included in the table layout as well as modify the overall appearance of the table layout. FIG. 5 is a screen shot illustrating an exemplary table view properties window that may be used to alter the appearance of the table layout as well as to select portions of the form layout to be included in the table layout. For instance, once the table view properties window is displayed, the user may wish to create a grid 502. In this example, the grid may be horizontal 504 as well as vertical 506. A grid style 508 may also be selected. In addition, the user may select those portions of the form layout that are to be included in the table layout. As shown, the user may wish to include a header portion 510 as well as the footer portion 512 in the table layout, if the selected portions have been created in the selected form layout. Moreover, column headers 402–406 may be provided in the table layout. As shown in FIG. 4, column headers 514 in the table layout correspond to fields of the form layout, shown as row headers in FIG. 1 and FIG. 2. The user may wish to enable columns to be resized 516 as well as reordered 518. In addition, the user may wish to sort data 520 when a column is selected. The size of the rows may also be specified through selecting a custom height option 522 which enables a user to specify the row height (e.g., by specifying a number of pixels 524). The user may then cancel 526 the selections or confirm the selections by clicking on "OK" 528 to continue. Once the table layout is displayed, the user may alter the order of the fields as well as modify the attributes (e.g., font size, degree of rotation, color) from within the table view window.

Figure 6:
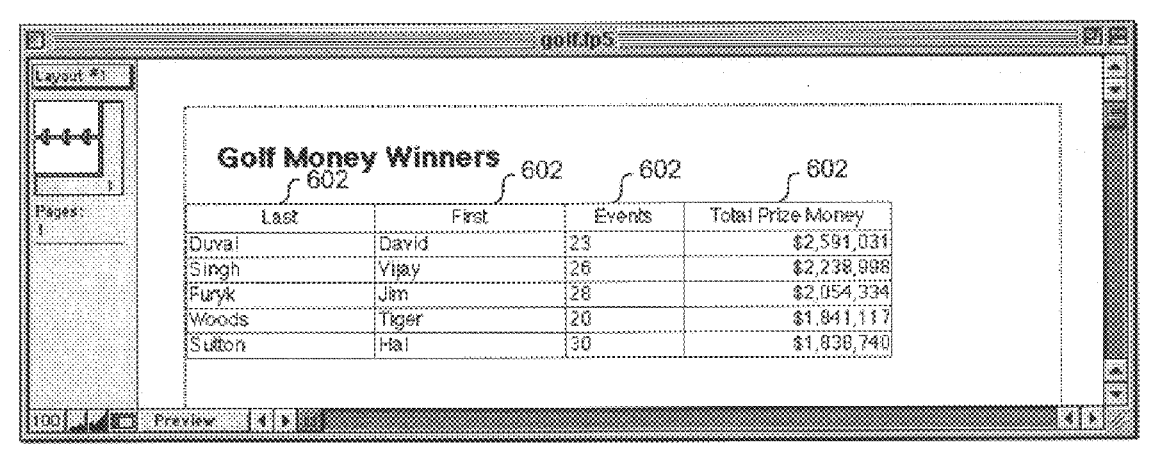

Once the user has converted the form layout to a table layout by selecting the view as table option, the table layout may be displayed or printed. FIG. 6 is a screen shot illustrating an exemplary print preview window used to view the table view window in print format. Due to the limitations of printers, it is desirable to modify the table layout so that it may easily be printed to any suitable printer. For example, column headers 602 may be printed without the shaded grid shown in FIG. 4.

Figure 7A:
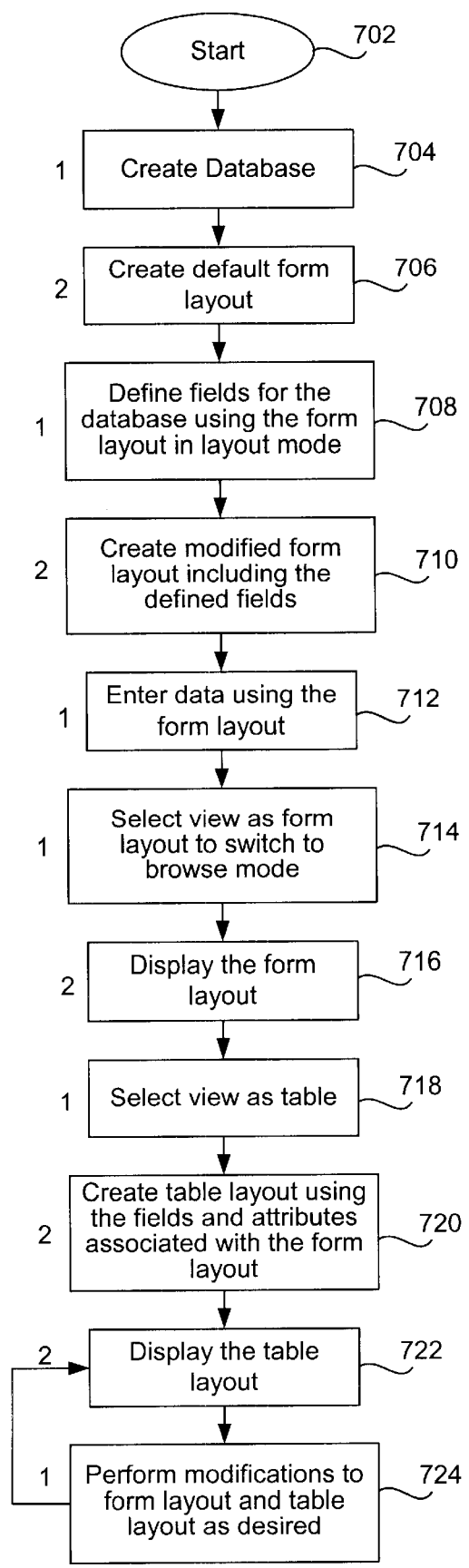
FIG. 7A is a general process flow diagram illustrating a method of viewing a table view of a database using formatting information from a form layout according to an embodiment of the invention.

As described above, the table layout is created using fields and associated formatting information from an existing form layout. For instance, the formatting information may identify the fields, the order of the fields, and attributes associated with the fields. The form layout may be created by the user prior selecting the "view as table" option. Alternatively, the form layout may be selected from a plurality of predetermined form layouts. FIG. 7A is a general process flow diagram illustrating a method of viewing a table view of a database using formatting information from a form layout according to an embodiment of the invention. As shown in FIG. 7A, those steps performed by the user are denoted by the number "1" while those steps performed automatically by the system are denoted by the number "2". The process begins at block 702, and at block 704 a database is created. In order to establish the fields that are included in each record of the database, a default form layout is created at block 706. The fields that are included in the database are then further defined or refined in layout mode at block 708. A modified form layout including the fields defined at block 708 is then created at block 710.

Once the fields are defined, the user may enter or provide one or more database records in the database using the form layout at block 712. The user may then select "view as form" to switch to browse mode 714. The form layout may then display fields and associated values from one of the database records at block 716. In this manner, the user may view those fields which have previously been defined as well as view a single record within the database.

In order to view multiple records within the database, the user may select the "view as table" option at block 718. As described above, the user may have made changes in layout mode to the fields in the form layout. The table layout is then created at block 720 using the fields and attributes associated with the form layout, as will be described in further detail below with reference to FIG. 8. The table layout is then displayed at block 722. In this manner, the changes previously made to the form layout in layout mode are reflected in the table layout of the database.

The user may wish to modify the form layout as well as the table layout. According to one embodiment, selected modifications to the form layout are applied to the table layout. However, once the table layout is modified, these changes are not incorporated into the form layout. Thus, modifications can be made to the form layout and the table layout at block 724 as desired. Those changes made to the form layout that are carried over to the table layout may be viewed when the table layout is displayed at block 722.

As shown at block 724, modifications can be made according to user specifications to both the form layout and the table layout. In other words, some modifications made to the form layout are included in the table layout while other modifications are ignored or overridden. On the contrary, modifications made to the table layout are not incorporated into the form layout.

Figure 7B:
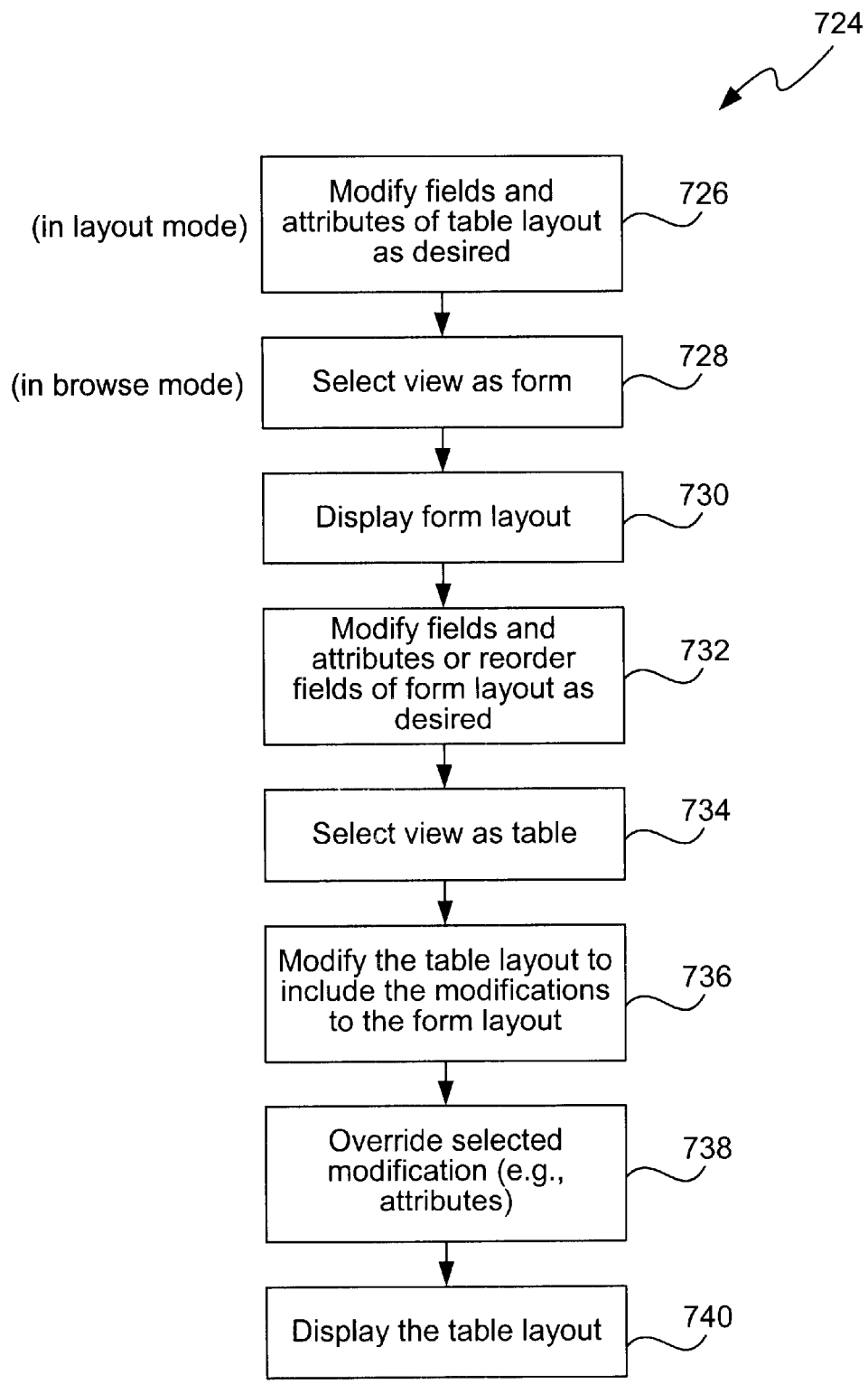
FIG. 7B is a flow diagram illustrating one method of modifying the form layout and associated table layout.

FIG. 7B is a flow diagram illustrating one method of modifying the form layout and associated table layout. At block 726, the user modifies fields and attributes of the table layout as desired. As one example, the user may wish to reorder the fields, add fields, or delete fields. As another example, the user may wish to modify attributes (e.g., font size, color) associated with various fields. When the user selects "view as form" at block 728, the form layout is displayed at block 730, allowing the user to view the fields of a single record. However, the form layout is preferably not modified in response to changes to the table layout. The user may similarly modify the form layout as desired at block 732. For instance, the user may modify fields and attributes, as well as the order of the fields and corresponding columns. When the user chooses to view the data according to the table layout at block 734 by selecting "view as table", the table layout is automatically modified to include selected modifications previously made to the form layout at block 736. For instance, added fields, deleted fields, and reordering of fields of the form layout may be incorporated into the table layout. In addition, attribute values corresponding to at least some of the attributes associated with the fields of the form layout may be translated to the table layout. For example, the font size may vary from field to field and may therefore be copied from the form layout to the table layout. Thus, all modifications made to the form layout may be transferred to the table layout. Alternatively, it may be desirable to override selected modifications (e.g., attributes) at block 738. The table layout is then displayed at block 740.

Figure 8:
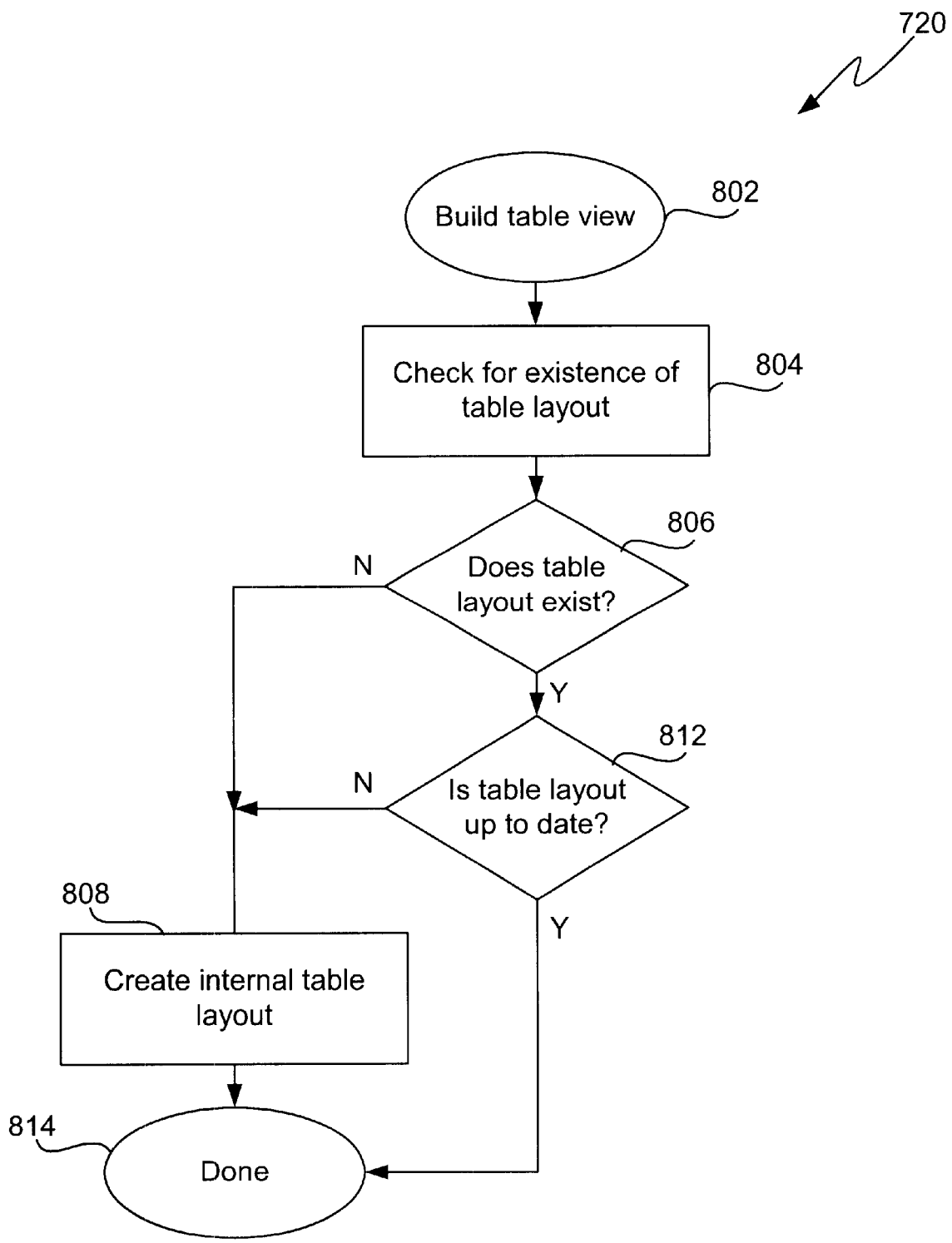
FIG. 8 is a process flow diagram illustrating a method of building a table view as shown at block 720 of FIG. 7 according to an embodiment of the invention.

As described above with reference to block 720 of FIG. 7A, the table layout is created using the fields and attributes associated with the form layout. FIG. 8 is a process flow diagram illustrating one method of building the table layout for a table view of the records of a database. The process begins at block 802 and at block 804 it is determined whether the table layout already exists. According to one embodiment, an internal table layout consists of one or more data structures that are used to define the table layout. If at block 806, it is determined that the table layout does not exist, the table layout is created at block 808. One method of creating the table layout is described in further detail below with reference to FIG. 9. The process ends at block 814. If at block 806, it is determined that the table layout already exists, it is determined whether the table layout is up-to-date at block 812. If the table layout is not up-to-date, an internal table layout is created at block 808 and the process continues at block 814. However, if at block 812, it is determined that the table layout is up-to-date, the table layout that exists need not be updated, and the process ends at block 814.

Figure 9:
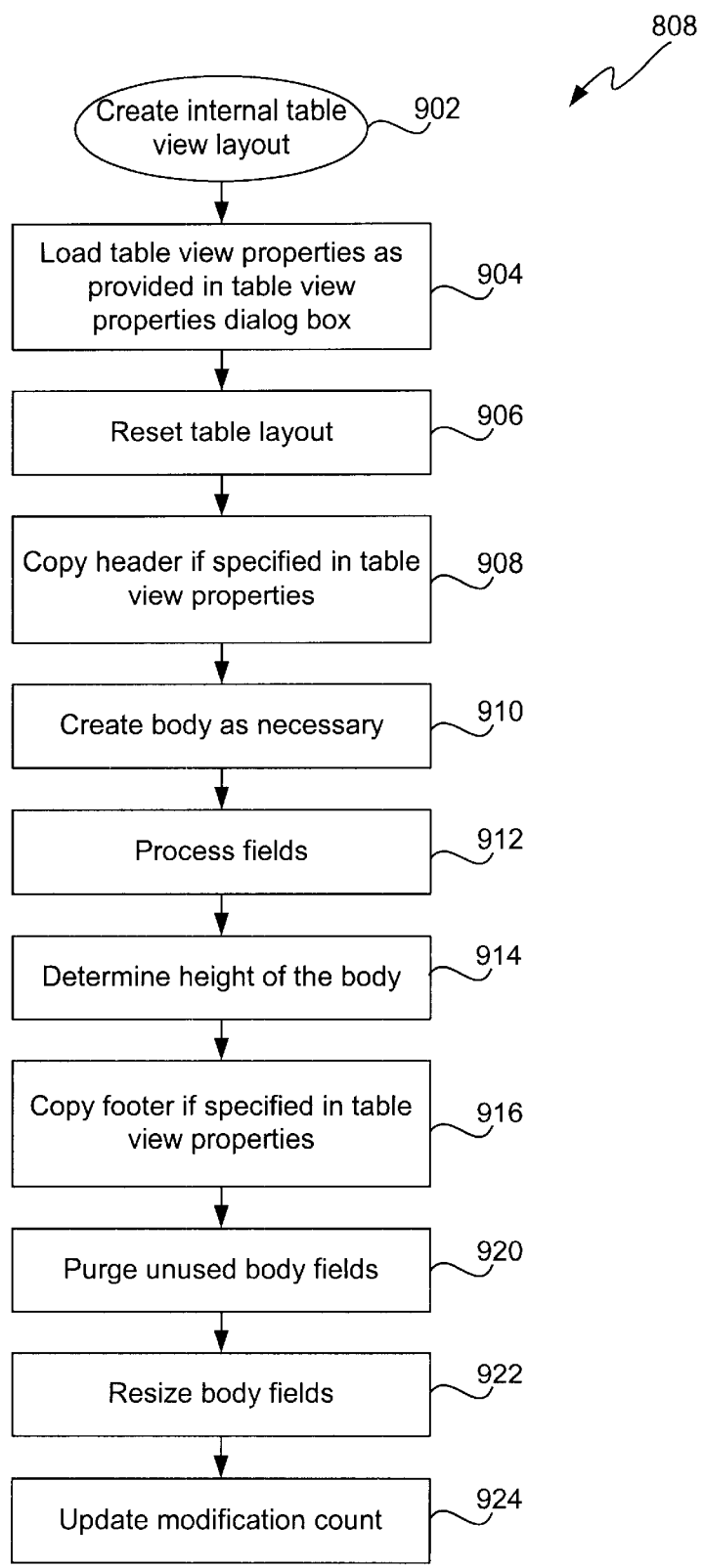
FIG. 9 is a process flow diagram illustrating a method of creating an internal table layout as shown at block 808 of FIG. 8 according to an embodiment of the invention.

As shown and described above, when the table layout does not exist or it is outdated, the table layout is created. FIG. 9 is a process flow diagram illustrating a method of creating an internal table layout as shown at block 808 of FIG. 8 according to an embodiment of the invention. The process begins at block 902, and at block 904 the properties as provided in the table view properties dialog box (see FIG. 5) are loaded. The table layout is then reset at block 906 such that any fields or sections which do not belong to the body of the table layout are deleted and all other fields (e.g., in the body of the table layout) that are not deleted are marked for deletion. Thus, unneeded non-body fields such as any existing header and footer are purged from the table layout. One method of resetting the table layout is described in further detail below with reference to FIG. 10A and FIG. 10B. In addition, the header is copied from the form layout to the table layout if specified in the table view properties dialog box at block 908. Next, the body that will be filled with data is created as necessary at block 910. The fields are then processed at block 912 such that the fields are added to the table layout in the appropriate order. At this time, attributes (e.g., font, color, degree of rotation) associated with the fields (e.g., remaining body fields) are then copied from the form layout to the table layout. Once all fields have been processed, the height of the body is determined from the height of the tallest field (e.g., according to font size) at block 914. The footer in the form layout is then copied to the table layout if specified in the table view properties dialog box at block 916. All unused body fields are purged from the table layout at block 920. The remaining body fields are then resized at block 922 such that the width and height of the fields are adjusted. More particularly, as described above with reference to block 914, the tallest field is used to determine the row height. This row height is then used to adjust the height of the body fields. The width of each of the body fields is adjusted based upon the data type of the field as well as the number of repetitions (e.g., sections or cells) in the specific field. In addition, according to one embodiment, the header (and footer) may similarly be resized.

According to one embodiment, in order to ensure that the table layout ultimately includes all modifications made to the form layout, a separate modification count is maintained for the form layout and the table layout. Each time a modification is made, the corresponding modification count is incremented. In other words, when the form layout is modified, its modification count will be incremented and therefore will not match the modification count of the table layout. In this manner, it is possible to ascertain whether the table layout is up-to-date. When the table layout is updated to match the form layout, the modification count of the table layout is updated and will be set to the modification count of the form layout at block 924.

Figure 10A:
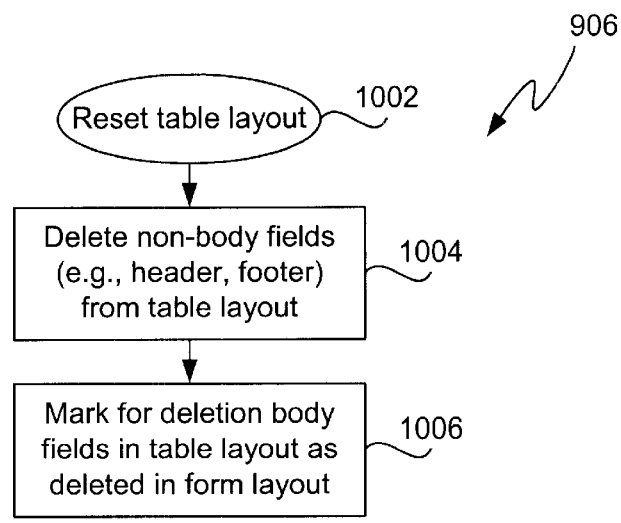
FIG. 10A is a process flow diagram illustrating a method of resetting the table layout as shown at block 906 of FIG. 9 according to an embodiment of the invention.

One method of resetting the table layout as shown at block 906 of FIG. 9 is presented in FIG. 10A. The process begins at block 1002, and at block 1004 all non-body fields (e.g., header, footer) are deleted from the table layout. Next, all body fields are marked for deletion in the table layout at block 1006. The fields that remain marked for deletion are later deleted from the table layout as described above with reference to blocks 918 and 920. Attributes associated with the remaining body fields are copied when the fields are processed at block 912.

Figure 10B:
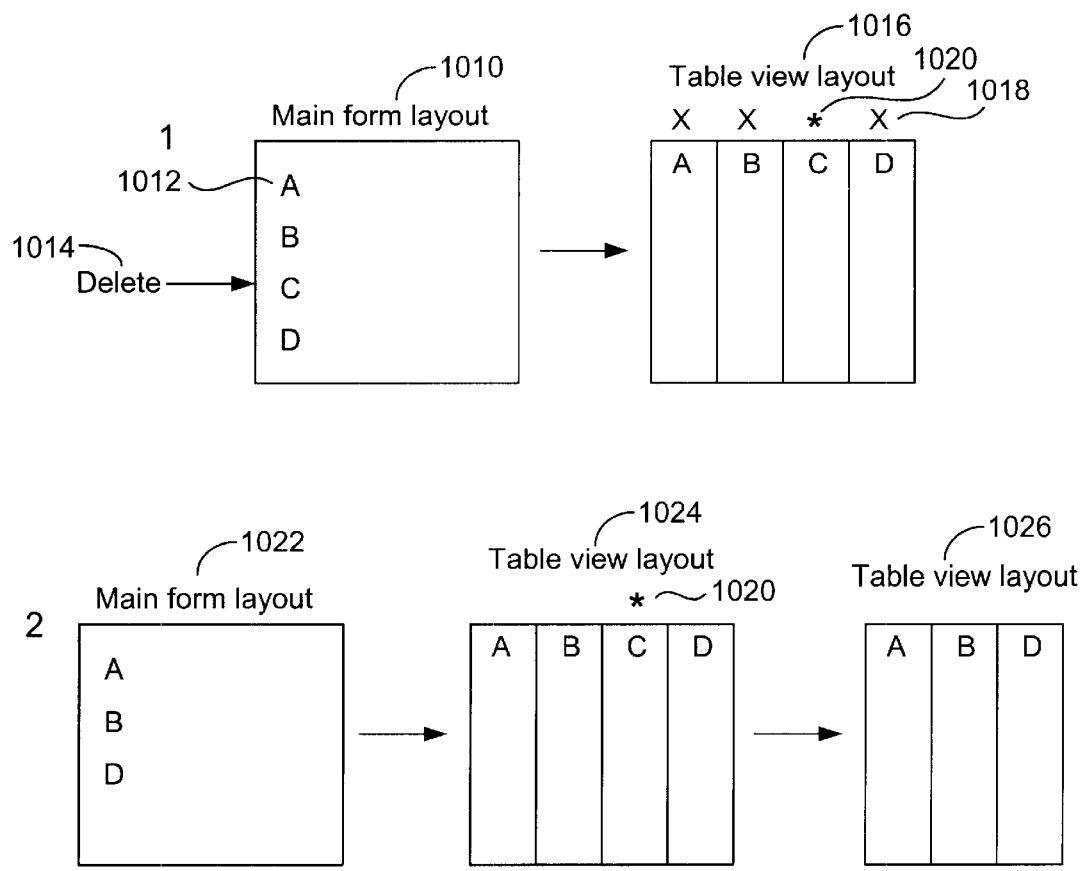
FIG. 10B is a block diagram illustrating an exemplary application of the method of resetting the table layout as shown in FIG. 10A.

FIG. 10B is a block diagram illustrating an exemplary application of the method of resetting the table layout presented in FIG. 10A. Form layout 1010 is shown to include four fields 1012: A, B, C, and D. The user chooses to delete field C from the form layout, as shown at 1014. Table layout 1016 is shown to include the four fields 1012 in the form layout 1010. Initially, all fields are marked for deletion, as shown at 1018.

The deletion flags are thereafter cleared for those fields that are not being deleted from the form layout. Thus, the deletion flag 1020 remains for the field C, since it has been deleted from the form layout 1010, but the deletion flags for fields A, B and D are cleared. As shown, the main form layout 1022 includes fields A, B, and D after the selected field C has been deleted. The table layout 1024 illustrates the status of the deletion flags after the flags have been cleared for those fields that remain in the form layout, leaving deletion flag 1020 associated with field C. All marked fields (i.e., fields with deletion flags set) are then deleted from the table layout as shown at 1026.

Figure 11A:
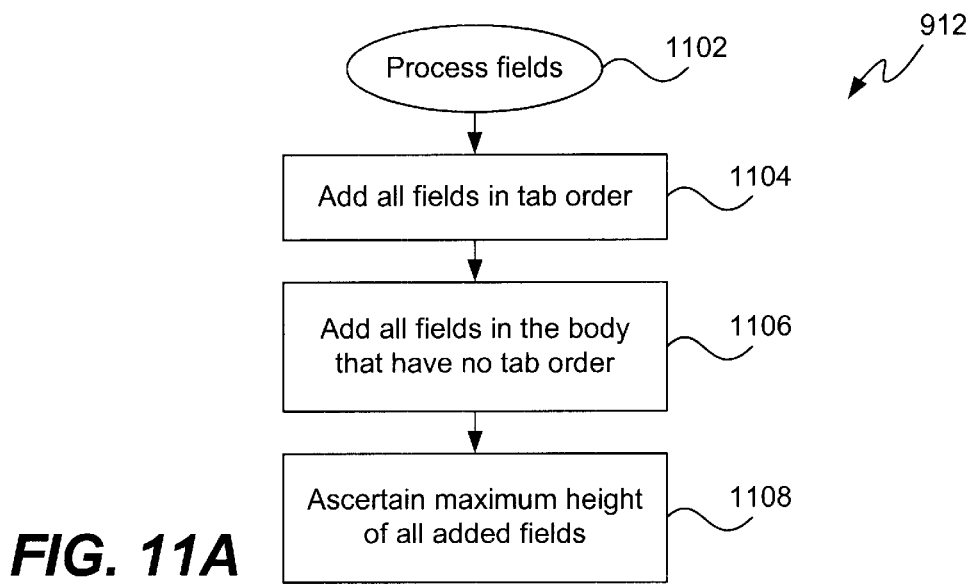
FIG. 11A is a process flow diagram illustrating a method of processing fields as shown at block 912 of FIG. 9 according to an embodiment of the invention.

As described above with reference to blocks 906 of FIG. 9 as explained in FIG. 10A, fields that have been deleted from the form layout remain marked for deletion in the table layout. Although various fields are marked for deletion, the unmarked fields may have actually been moved within the table layout by the user. Thus, it is important that the order in which the fields have been created or moved within the table layout be retained. Moreover, it is important that the attributes for the unmarked fields (i.e., remaining fields) be copied to the table layout. FIG. 11A is a process flow diagram illustrating a method of processing fields as shown at block 912 of FIG. 9 according to an embodiment of the invention. The process begins at block 1102, and at block 1104 all fields (e.g., fields that have not been deleted) in the form layout having a specified tab order are added to the table layout, as described in further detail below with reference to FIG. 12. The tab order is a custom order that is a default order or an order set by the user. However, according to one embodiment, if the user has reordered the fields (e.g., columns) in the table layout, it is presumed that the user does not wish to alter the order, even where some of the columns have not been reordered. Thus, the order of the current table layout is retained and any additional fields present in the form layout are added to the end (or beginning) of the table layout. In this manner, the previous order of the fields in the table layout is retained. Following the processing of those fields having a tab order, those fields in the body of the form layout that have no tab order are then added to the body of the table layout at block 1106. For instance, these unordered fields may be added to the table layout before the first field in the tab order or after the last field in the tab order. The maximum height of all added fields is then ascertained at block 1108 so that the appropriate row height may later be ascertained.

Figure 11B:
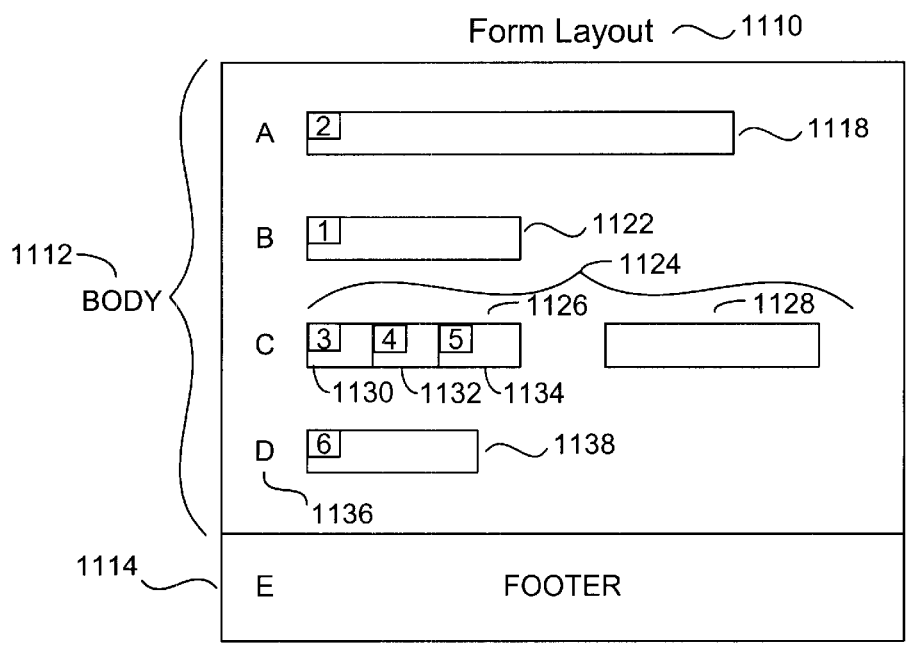
FIG. 11B is a block diagram illustrating an exemplary table layout created from an exemplary Form Layout after processing fields using the method shown in FIG. 11A.
Figure 11B:
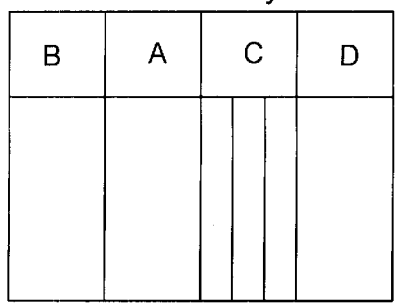

FIG. 11B is a block diagram illustrating an exemplary table layout created from an exemplary form layout after processing fields using the method presented in FIG. 11A. An exemplary form layout 1110 is shown to include a body 1112 and a footer 1114. The body 1112 includes a first field 1118 and a second field 1122. In addition, a third field 1124 is shown to include two occurrences 1126 and 1128. The first occurrence 1126 has three cells, 1130, 1132 and 1134. A fourth field 1136 includes a single occurrence 1138. While the first field 1116, second field 1120, third field 1124, and fourth field 1136 have a specified tab order, the footer 1114 does not. More particularly, according to one embodiment, the sections of the table layout (e.g., header, body, footer) do not have a tab order, while fields may have a tab order. The tab order is specified by the numbers 1–6 depicted in the form layout 1110.

As shown at 1140, all fields are copied such that the tab order is maintained. All fields having a specified tab order (e.g., B A, C, D) are copied. In addition, all fields in the body 1112 that have no tab order are copied. In this example, no fields remain in the body 1112 that have no specified tab order. Although the footer 1114 does not have a specified tab order, the footer 1114 is not included in the body 1112 and therefore is not included in the table layout 1140.

Figure 12:
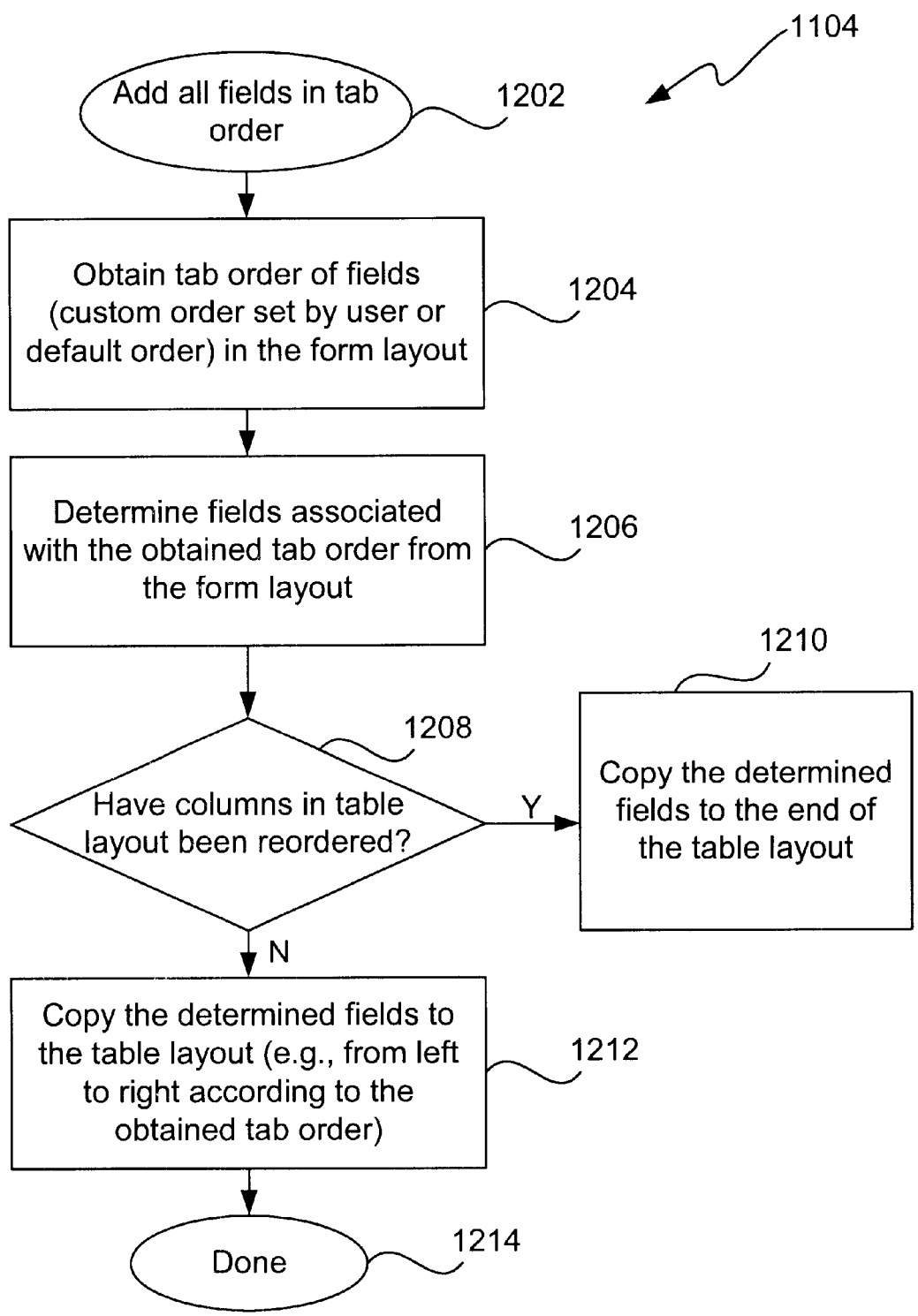
FIG. 12 is a process flow diagram illustrating a method of adding fields in tab order as shown at block 1104 of FIG. 11A according to an embodiment of the invention.

As described above with reference to FIG. 11A, all fields having a tab order are added. FIG. 12 is a process flow diagram illustrating a method of adding fields in tab order as shown at block 1104 of FIG. 11A according to an embodiment of the invention. The process begins at block 1202, and at block 1204 the tab order of the fields in the form layout is obtained. The fields associated with the obtained tab order are then obtained from the form layout at block 1206. If it is determined at block 1208 that any of the fields (e.g., columns) in the table layout have been reordered, it is presumed that the user wishes to preserve this order. The new fields are therefore added to the end of the table layout and attributes of the existing fields are updated without disturbing the existing order at block 1210. If the columns have not been reordered, the determined fields are copied to the table layout according to the obtained tab order at block 1212. A method of copying fields will be described in further detail below with reference to FIG. 14. The process ends at block 1214.

Figure 13:
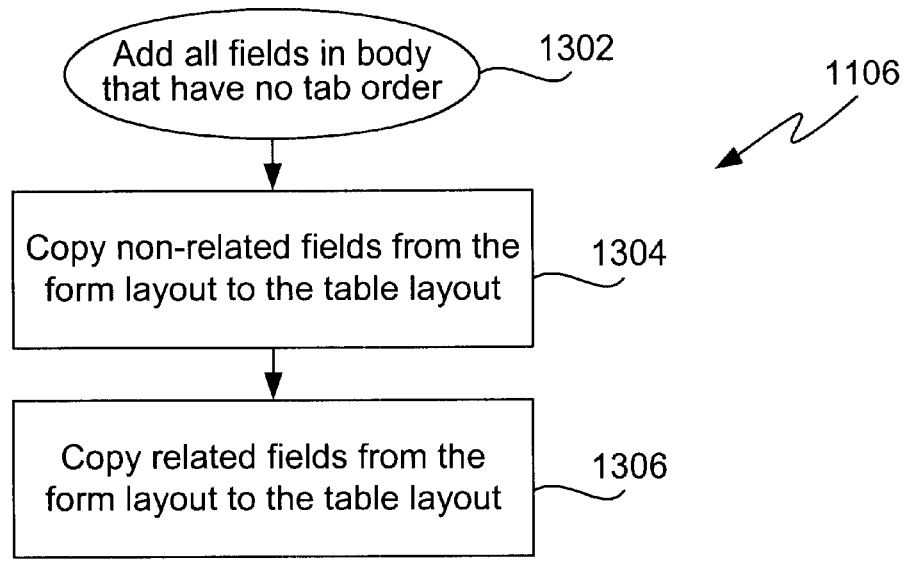
FIG. 13 is a process flow diagram illustrating a method of adding fields that have no tab order as shown at block 1106 of FIG. 11 A according to an embodiment of the invention.

In addition to those fields having a specified tab order, fields in the body that have no tab order are copied from the form layout to the table layout, as shown at block 1106 of FIG. 11A. FIG. 13 is a process flow diagram illustrating a method of adding fields that have no tab order as shown at block 1106 of FIG. 11A according to an embodiment of the invention. The process begins at block 1302 and at block 1304, non-related body fields are copied from the form layout to the table layout. Next, related body fields (e.g., first name and last name fields) are copied from the form layout to the table layout at block 1306. One method of copying fields will be described in further detail below with reference to FIG. 14. Although body fields that have no tab order are organized by relationship such that non-related fields are displayed first, alternative methods of organizing fields in the table layout may be implemented.

Figure 14:
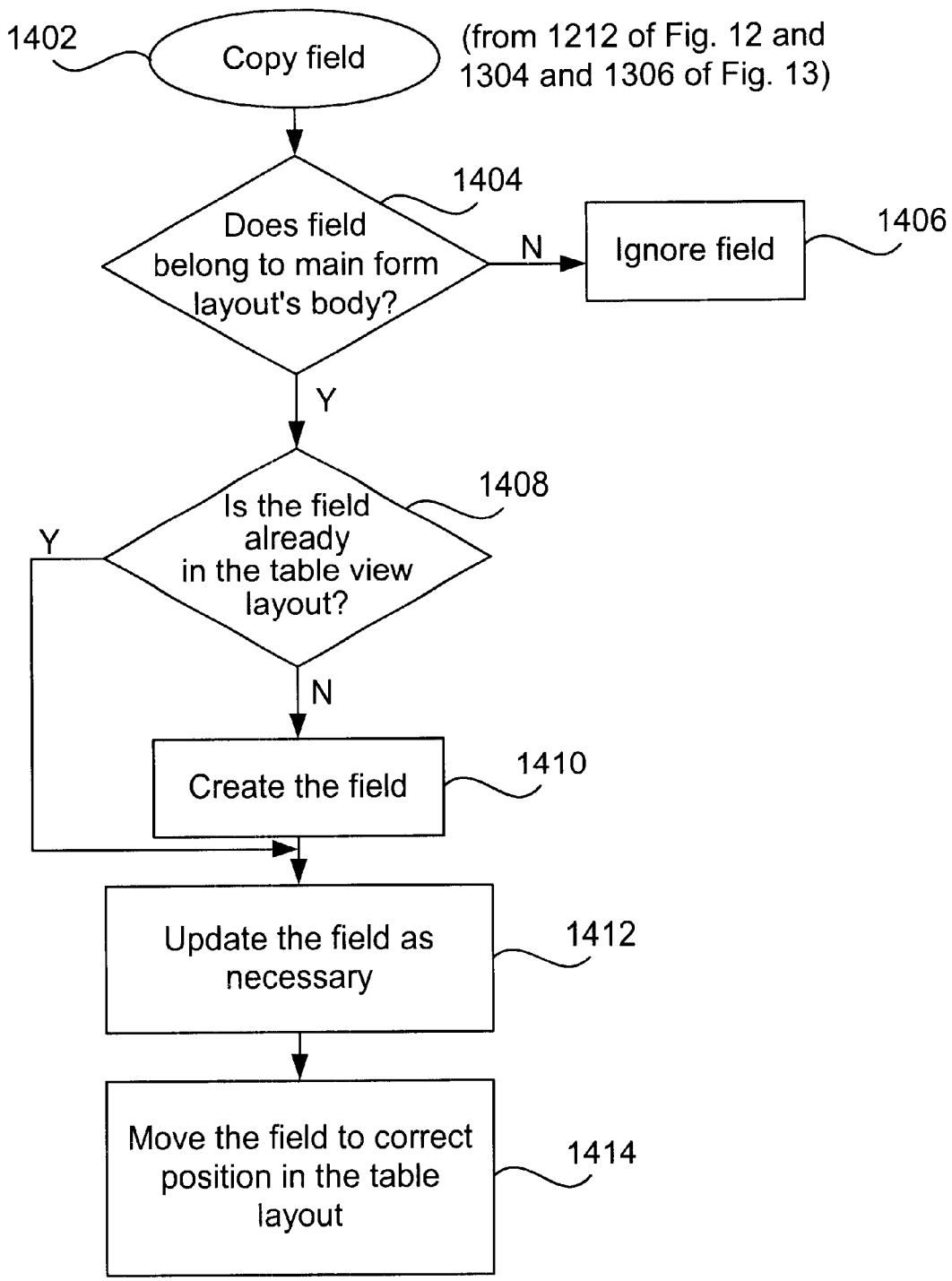
FIG. 14 is a process flow diagram illustrating a method of copying a field as performed in block 1212 of FIG. 12 and block 1306 of FIG. 13 according to an embodiment of the invention.

As shown and described above with reference to block 1212 of FIG. 12 and blocks 1304 and 1306 of FIG. 13, fields that have a tab order and body fields that have no tab order are copied from the form layout to the table layout. FIG. 14 is a process flow diagram illustrating a method of copying a field as performed in block 1212 of FIG. 12 and blocks 1304 and 1306 of FIG. 13 according to an embodiment of the invention. The process begins at block 1402, and at block 1404 it is determined whether the field belongs to the body of the form layout. If the field does not belong to the body of the form layout, the field is ignored at block 1406. However, if the field does belong to the body of the form layout, it is determined whether the field already exists in the table layout at block 1408. For instance, the field may already exist in the table layout since the user may have modified the tab order as well as one or more of the fields in the table layout. If the field is not already in the table layout, the field is created at block 1410. One method of creating the field will be described in further detail below with reference to FIG. 15. Otherwise, the process continues at block 1412 where the field is updated as necessary. In other words, the deletion flag is updated as appropriate so that each field is processed only once. The field is then moved to the correct position in the table layout at block 1414. For instance, where the fields being copied are body fields having no tab order, the fields may be moved to the end of the table.

Figure 15:
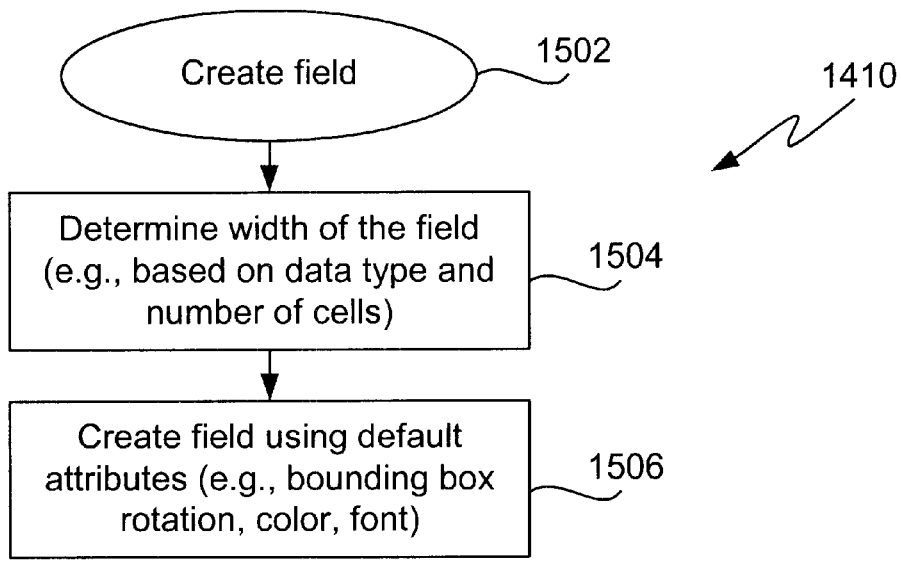
FIG. 15 is a process flow diagram illustrating a method of creating a field as performed in block 1410 of FIG. 14 according to an embodiment of the invention.

As described above, when a field is copied from the form layout to the table layout, the field is created in the table layout if it does not already exist in the table layout. FIG. 15 is a process flow diagram illustrating a method of creating a field as performed in block 1410 of FIG. 14 according to an embodiment of the invention. The process begins at block 1502, and at block 1504 the width of the field is determined. For instance, the width of the field may be determined based upon the data type of the field and the number of cells associated with the field. The field is then created at block 1506 using default attributes for creation. For instance, the default attributes may specify the dimensions of the field, the number of cells, and a degree of rotation.

Figure 16:
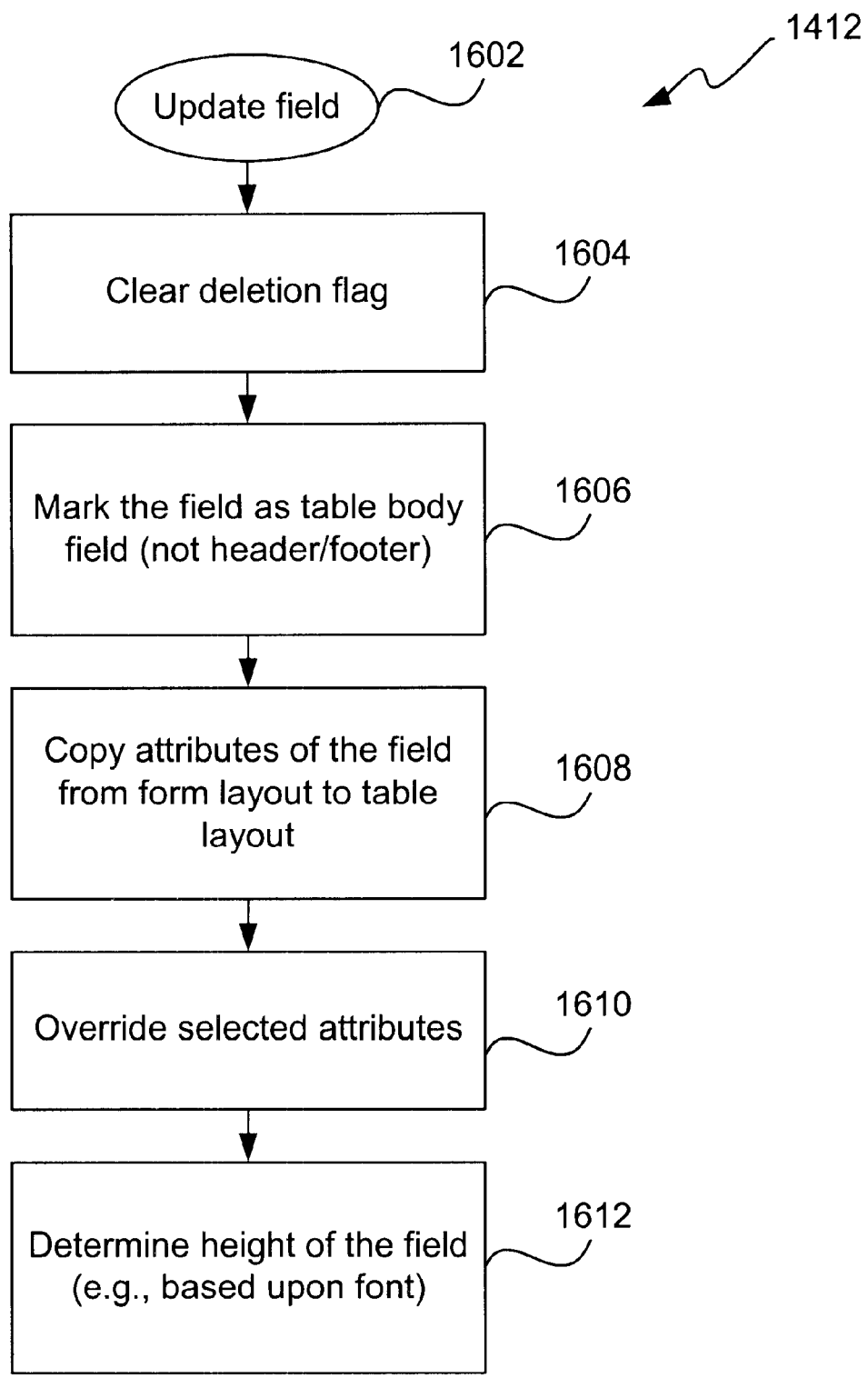
FIG. 16 is a process flow diagram illustrating a method of updating a field as shown at block 1412 of FIG. 14 according to an embodiment of the invention.

When the field is created through a process such as that illustrated in FIG. 15, the field is updated as necessary. FIG. 16 is a process flow diagram illustrating a method of updating a field as shown at block 1412 of FIG. 14 according to an embodiment of the invention. The process begins at block 1602, and at block 1604 the deletion flag associated with the field is cleared. The deletion flag is cleared for two reasons. First, the deletion flag is cleared to indicate that the field should not be deleted. Second, the field may be displayed in more than one location on the form layout. For instance, the field may be used in a header as well as in another location below the header. Although the field may be displayed more than once, it is desirable to process the field only once. Thus, the deletion flag is cleared after the field is processed. Next, the field is marked as a body field at block 1606 to indicate that the field is located within the body of the table layout rather than a header or footer. The attributes associated with the field are then copied from the form layout to the table layout at block 1608. For instance, attributes such as color, font, data type, and number of repetitions may be copied from a layout object in the form layout. Selected attributes can then be overridden at block 1610. For instance, it may be desirable to maintain a specific font or bounding box within the table layout. Thus, these attributes are not overridden or copied from the form layout. The height of the field is then determined at block 1612, which is later used to determine the height of the body within the table layout. As described above, the height of the field may be determined based upon the font associated with the field.

Figure 17:
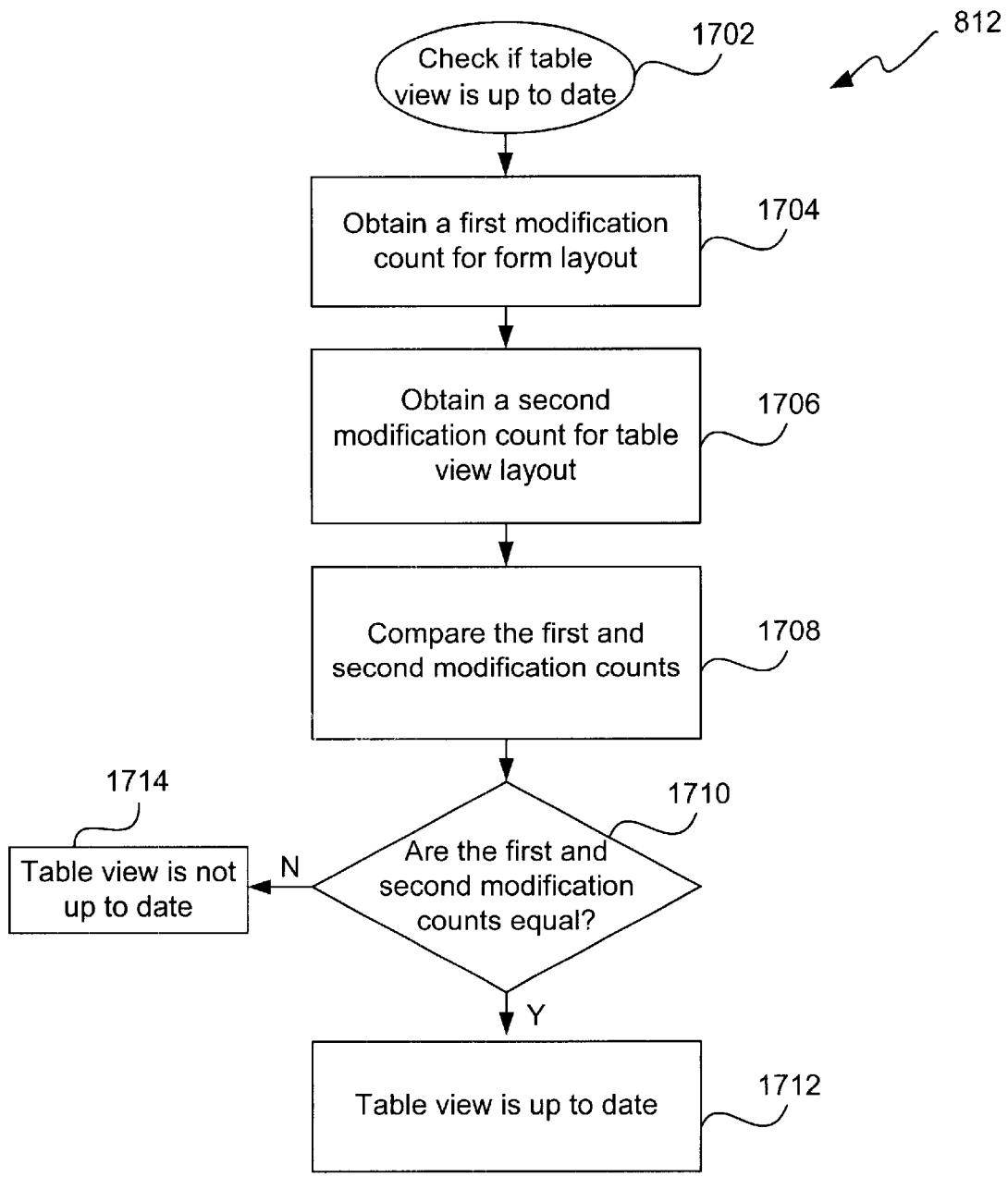
FIG. 17 is a process flow diagram illustrating a method of verifying if the table view is up-to-date as shown at block 812 of FIG. 8 according to an embodiment of the invention.

As described above with reference to FIG. 8, the table layout is created when it is determined that the table layout does not exist or it is not up-to-date. FIG. 17 is a process flow diagram illustrating a method of verifying if the table view is up-to-date as shown at block 812 of FIG. 8 according to an embodiment of the invention. The process begins at block 1702, and at block 1704 a first modification count associated with the form layout is obtained. Next, a second modification count associated with the table layout is obtained at block 1706. The first and second modification counts are then compared at block 1708. If it is determined at block 1710 that the modification counts are equal, the table layout need not be updated since the table view is determined to be up-to-date at block 1712. However, if the modification counts are not equal, the table layout used to provide the table view is determined not to be up-to-date at block 1714.

The present invention enables database records to be displayed in a table format to facilitate comparison of the fields of the database records. This is accomplished through the creation of a table layout using formatting information previously established in an existing form layout. Thus, software used to create and display the form layout may be used (i.e., leveraged) to create and display the table layout. As a result, the programming and testing time required to create the table layout from the form layout are minimized. Moreover, since formatting information is automatically translated from the form layout to the table layout, the efforts required on the part of the user or developer in formatting the data for a table layout are dramatically reduced.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 18:
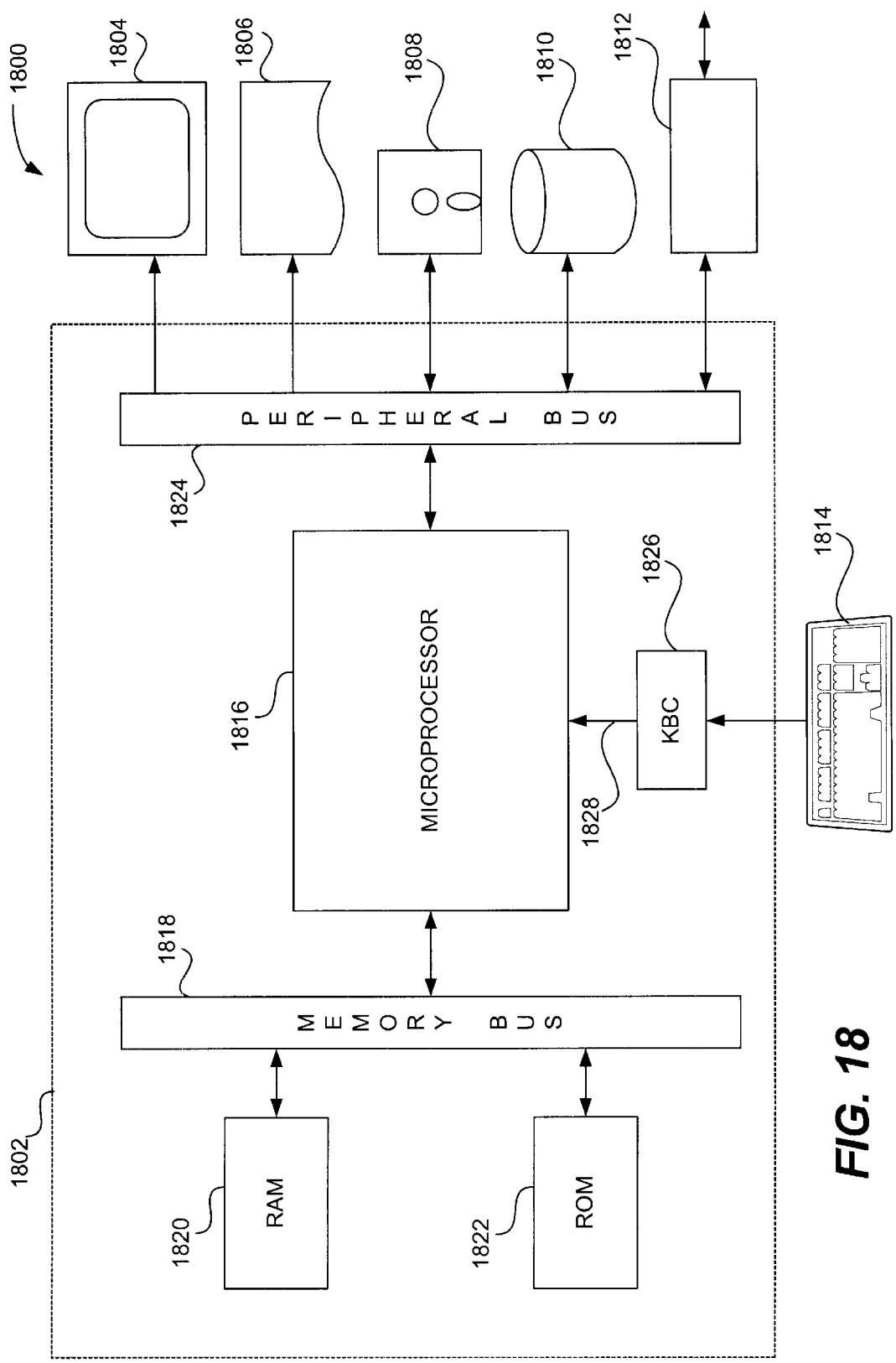
FIG. 18 is a block diagram of an exemplary computer system for carrying out the processing according to the invention.

FIG. 18 is a block diagram of an exemplary computer system 1800 for carrying out the processing according to the invention. The computer system 1800 includes a digital computer 1802, a display screen (or monitor) 1804, a printer 1806, a floppy disk drive 1808, a hard disk drive 1810, a network interface 1812, and a keyboard 1814. The digital computer 1802 includes a microprocessor 1816, a memory bus 1818, random access memory (RAM) 1820, read only memory (ROM) 1822, a peripheral bus 1824, and a keyboard controller 1826. The digital computer 1800 can be a personal computer or some other type of computer.

The microprocessor 1816 is a general purpose digital processor which controls the operation of the computer system 1800. The microprocessor 1816 can be a single-chip processor or can be implemented with multiple components. Using instructions retrieved from memory, the microprocessor 1816 controls the reception and manipulation of input data and the output and display of data on output devices. According to the invention, a particular function of microprocessor 1816 is to assist in the operation of a database program supporting, among other things, table layouts The memory bus 1818 is used by the microprocessor 1816 to access the RAM 1820 and the ROM 1822. The RAM 1820 is used by the microprocessor 1816 as a general storage area and as scratch-pad memory, and can also be used to store input data and processed data. The ROM 1822 can be used to store instructions or program code followed by the microprocessor 1816 as well as other data.

The peripheral bus 1824 is used to access the input, output, and storage devices used by the digital computer 1802. In the described embodiment, these devices include the display screen 1804, the printer device 1806, the floppy disk drive 1808, the hard disk drive 1810, and the network interface 1812. The keyboard controller 1826 is used to receive input from keyboard 1814 and send decoded symbols for each pressed key to microprocessor 1816 over bus 1828.

The display screen 1804 is an output device that displays images of data provided by the microprocessor 1816 via the peripheral bus 1824 or provided by other components in the computer system 1800. The printer device 1806 when operating as a printer provides an image on a sheet of paper or a similar surface. Other output devices such as a plotter, typesetter, etc. can be used in place of, or in addition to, the printer device 1806.

The floppy disk drive 1808 and the hard disk drive 1810 can be used to store various types of data. The floppy disk drive 1808 facilitates transporting such data to other computer systems, and hard disk drive 1810 permits fast access to large amounts of stored data.

The microprocessor 1816 together with an operating system operate to execute computer code and produce and use data. The computer code and data may reside on the RAM 1820, the ROM 1822, or the hard disk drive 1820. The computer code and data could also reside on a removable program medium and loaded or installed onto the computer system 1800 when needed. Removable program mediums include, for example, CD-ROM, PC-CARD, floppy disk and magnetic tape.

The network interface 1812 is used to send and receive data over a network connected to other computer systems. An interface card or similar device and appropriate software implemented by the microprocessor 1816 can be used to connect the computer system 1800 to an existing network and transfer data according to standard protocols.

The keyboard 1814 is used by a user to input commands and other instructions to the computer system 1800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Broadly speaking, the operations described above may be used to generate layouts or reports based on fields of databases stored in a number of mediums. By way of example, the databases may be stored on a disk drive, a hard drive, a floppy disk, a server computer, a remotely networked computer, etc. Moreover, although the present invention describes the generation of layouts or reports from a single database, reports may be generated using data from multiple databases as well as alternate sources. Accordingly, the present embodiments are to be considered as illustrative and not restrictive, and the invention is not to be limited to the details given herein, but may be modified within the scope and equivalents of the appended claims.

What is claimed is:

1. A method of creating a report format suitable for displaying data associated with one or more of a plurality of database records, the method comprising:

obtaining a first layout, the first layout including a plurality of database fields having associated formatting information, the first layout being a first report format adapted for displaying data associated with one or more database records;

creating a second layout from the first layout such that the second layout includes one or more of the plurality of database fields, the second layout being a report format adapted for displaying data associated with the plurality of database records such that data values associated with the same database field are displayed adjacent to one another; and associating at least a portion of the formatting information of the first layout with the one or more of the plurality of database fields in the second layout such that the second layout includes the at least a portion of the formatting information from the first layout, the second layout being a second report format adapted for displaying data associated with one or more database records.

2. The method as recited in claim 1, further comprising:

providing the second layout using the formatting information associated with the one or more of the plurality of database fields.

3. The method as recited in claim 1, wherein the first layout is adapted for at least one of obtaining and displaying data for a single one of the plurality of database records.

4. The method as recited in claim 1, wherein the formatting information identifies the order of the plurality of database fields.

5. The method as recited in claim 1, wherein the plurality of database records are stored in one or more databases.

6. The method as recited in claim 1, wherein the first layout is a form layout and the second layout is a table layout.

7. A method of creating a report format suitable for displaying data associated with one or more of a plurality of database records, the method comprising:

obtaining a first layout, the first layout including a body defining a plurality of database fields having a specified order and associated attributes, each of the associated attributes having a corresponding attribute value, the first layout being a first report format adapted for displaying data associated with one or more database records;

creating a second layout from the first layout such that the second layout includes selected ones of the plurality of database fields, the second layout being a report format adapted for displaying a plurality of database records such that data values associated with the same database field of the plurality of database records are displayed adjacent to one another; and copying attribute values corresponding to at least some of the attributes associated with the plurality of database fields from the first layout to the second layout such that the second layout includes the attribute values corresponding to at least some of the attributes associated with the plurality of database fields from the first layout, the second layout being a second report format adapted for displaying data associated with one or more database records.

8. The method as recited in claim 7, the first layout being adapted for displaying a plurality of records such that values associated with the same database field of the plurality of database records are not displayed adjacent to one another.

9. The method as recited in claim 7, wherein the first layout is a form layout and the second layout is a table layout.

10. A method of displaying data associated with one or more of a plurality of database records, the method comprising:

obtaining a first layout, the first layout including a body defining a plurality of fields having a specified order and associated attributes, each of the associated attributes having a corresponding attribute value, the first layout being adapted for displaying one or more records such that database fields associated with a single one of the database records are displayed in multiple rows or columns, the first layout being a first report format adapted for displaying data associated with one or more database records;

creating a second layout from the first layout such that the second layout includes selected ones of the plurality of fields, the second layout being adapted for displaying a plurality of database records such that values associated with the same database field of the plurality of database records are displayed in a single row or column;

copying attribute values corresponding to at least some of the attributes associated with the plurality of database fields from the first layout to the second layout such that the second layout includes the attribute values corresponding to the at least some of the attributes associated with the plurality of database fields from the first layout, the second layout being a second report format adapted for displaying data associated with one or more database records; and displaying data associated with the plurality of database records in the second layout.

11. The method as recited in claim 10, wherein displaying the second layout comprises printing the second layout.

12. The method as recited in claim 10, wherein said creating of the second layout comprises:

creating one or more columns in the second layout; and identifying each of the selected ones of the plurality of database fields with one of the columns in the second layout.

13. The method as recited in claim 12, wherein said creating of the second layout further comprises creating a column header for each one of the columns in the second layout, each column header identifying one of the selected ones of the plurality of database fields.

14. A computer readable medium including computer code for providing a table layout suitable for use in displaying data associated with one or more of a plurality of database records, comprising:

computer code for displaying a form layout, the form layout including a body defining a plurality of database fields having a specified order and associated attributes, each of the associated attributes having a corresponding attribute value, the form layout being a first report format adapted for displaying data associated with one or more database records;

computer code for creating a table layout from the form layout such that the table layout includes the plurality of database fields, the table layout being adapted for displaying a plurality of database records such that values associated with the same database field of the plurality of records are displayed adjacent to one another; and computer code for transferring attribute values corresponding to at least some of the attributes associated with the plurality of database fields from the form layout to the table layout such that the table layout includes the attribute values corresponding to at least some of the attributes associated with the plurality of database fields from the form layout, the table layout being a second report format adapted for displaying data associated with one or more database records.

15. The computer readable medium as recited in claim 14, further comprising:

computer code for assigning default attribute values to selected ones of the attributes in the table layout.

16. The computer readable medium as recited in claim 14, further comprising:

computer code for making modifications to selected ones of the plurality of database fields of the form layout; and computer code for modifying the table layout to include the modifications made to the form layout.

17. The computer readable medium as recited in claim 14, further comprising:

computer code for making modifications to selected ones of the attribute values of the form layout; and computer code for modifying the table layout to include the modifications made to the form layout.

18. The computer readable medium as recited in claim 14, further comprising:

computer code for deleting one of the plurality of database fields from the form layout;

computer code for deleting the one of the plurality of database fields from the table layout; and computer code for copying attribute values from the form layout to the table layout for each of the plurality of database fields that have not been deleted.

19. The computer readable medium as recited in claim 14, further comprising:

computer code for reordering selected ones of the plurality of database fields in the table layout such that the order of the plurality of the database fields in the form layout remains unchanged.

20. The computer readable medium as recited in claim 14, wherein said computer code for creating the table layout comprises:

computer code for identifying selected ones of the plurality of database fields in the form layout that have an associated order;

computer code for determining whether one or more of the plurality of database fields in the table layout have been reordered; and computer code for copying the selected ones of the plurality of database fields from the form layout to the table layout when it is determined that the database fields in the table layout have not been reordered.

21. A method of providing a first format suitable for use in displaying data associated with one or more of a plurality of records, the first format being obtained at least in part from a second format, the method comprising:

obtaining the second format, the second format including a body defining a plurality of database fields having a specified order and associated attributes, each of the associated attributes having a corresponding attribute value;

providing the first format such that the first format includes the plurality of database fields, the first format being a first report format adapted for displaying data associated with one or more database records; and copying attribute values corresponding to at least some of the attributes associated with the plurality of database fields from the second format to the first format such that the first format includes the attribute values corresponding to at least some of the attributes associated with the plurality of database fields from the second format, the second format being a second report format adapted for displaying data associated with one or more database records.

22. The method as recited in claim 21, further comprising displaying data associated with the plurality of database records in the first format.

23. The method as recited in claim 21, wherein database fields of the second format are defined by rows of the second format and database fields of the first format are defined by columns of the first format.

24. The method as recited in claim 23, further comprising at least one of reordering and resizing one or more of the columns.

25. The method as recited in claim 23, further including sorting data associated with one of the columns.

26. The method as recited in claim 21, wherein the first format is a table format adapted for displaying a plurality of records such that values associated with the same database field of the plurality of database records are displayed adjacent to one another.

27. The method as recited in claim 21, further comprising:
associating attribute values with selected attributes of the plurality of database fields of the first format such that the attribute values associated with the selected attributes override attribute values of the second format.

28. The method as recited in claim 21, wherein the attributes and associated attribute values together identify at least one of color, degree of rotation, and font size.

29. The method as recited in claim 21, further comprising:
modifying selected ones of the plurality of database fields of the second format; and
modifying the first format to incorporate the modifications to the selected ones of the plurality of database fields of the second format.

30. The method as recited in claim 29, wherein modifying selected ones of the plurality of database fields of the second format includes deleting the selected ones of the plurality of database fields of the second format.

31. The method as recited in claim 29, wherein the first format has a first modification count and the second format has a second modification count, the method further comprising:
determining whether the first modification count and the second modification count are equal; and
when it is determined that the first modification count and the second modification count are not equal, modifying the first format to incorporate the modifications to the selected ones of the plurality of fields of the second format and updating the first modification count.

32. The method as recited in claim 21, further comprising:
modifying attribute values associated with attributes corresponding to selected ones of the plurality of database fields of the second format; and
modifying the first format to incorporate the modifications to the attribute values associated with the selected ones of the plurality of database fields.

33. The method as recited in claim 32, wherein the first format has a first modification count and the second format has a second modification count, the method further comprising:
determining whether the first modification count and the second modification count are equal; and
when it is determined that the first modification count and the second modification count are not equal, modifying the first format to incorporate the modifications to the attribute values associated with the selected ones of the plurality of database fields and updating the first modification count.

34. The method as recited in claim 21, wherein the second format further includes at least one of a header and a footer, the method further comprising:
copying at least one of the header and the footer from the second format to the first format.

35. The method as recited in claim 21, wherein providing the first format comprises:
adding a first set of the plurality of fields to the first format while maintaining the specified order, each one of the first set of the plurality of fields having a position associated with the specified order; and
adding a second set of the plurality of fields to the first format, wherein the second set of the plurality of fields is unrelated to the specified order.

36. The method as recited in claim 35, wherein adding the first set and the second set of the plurality of fields comprises using a set of default attributes.

37. The method as recited in claim 35, further comprising:
ascertaining a maximum height of all added fields, the added fields including the first set of the plurality of fields and the second set of the plurality of fields; and
resizing the plurality of fields for the first format in accordance with the maximum height of the added fields.

38. The method as recited in claim 37, wherein resizing further comprises determining the maximum height based upon a font associated with the added fields.

39. The method as recited in claim 37, wherein resizing further comprises determining a width of each of the plurality of fields.

40. The method as recited in claim 39, wherein determining the width of each of the plurality of fields comprises determining a data type and number of cells associated with each of the plurality of fields.

41. The method as recited in claim 35, wherein adding the first set of the plurality of fields comprises:
determining whether the plurality of fields in the first format have been reordered; and
copying the first set of the plurality of fields to the first format while maintaining the specified order when it is determined that the plurality of fields in the first format have not been reordered.

42. The method as recited in claim 35, wherein adding the second set of the plurality of fields comprises:
copying non-related fields from the second format to the first format; and
copying related fields from the second format to the first format.

43. The method as recited in claim 21, wherein the specified order is set by at least one of user input and a default order.

44. The method as recited in claim 21, wherein providing the first format comprises modifying the first format while maintaining the specified order of the plurality of database fields that have not been reordered in the first format.

45. The method as recited in claim 21, wherein providing the first format comprises modifying the first format such that the specified order of the plurality of database fields is maintained when none of the plurality of database fields have been reordered in the first format.

46. A method of providing a table layout of a form layout including a body defining a plurality of database fields having a specified order and associated attributes, each of the associated attributes having a corresponding attribute value, the method comprising:

including the plurality of database fields in the table layout, the table layout being a first report format adapted for displaying data associated with one or more database records;

deleting one of the plurality of database fields from the form layout, the form layout being a second report format adapted for displaying data associated with one or more database records;

marking for deletion the deleted one of the plurality of database fields in the table layout; and copying attribute values for each unmarked one of the plurality of database fields from the form layout to the table layout such that the table layout includes the attribute values for each unmarked one of the plurality of fields from the form layout.

47. The method as recited in claim 46, further including deleting each of the plurality of database fields that have been marked for deletion.

48. The method as recited in claim 46, wherein the form layout further includes non-body fields including at least one of a header and a footer, the method further comprising:

deleting the non-body fields from the table layout.

49. The method as recited in claim 46, further comprising identifying the unmarked fields as body fields.

* * * * *